United States Patent [19]

Hadaway

[11] 3,980,261
[45] Sept. 14, 1976

[54] SPEED GOVERNORS

[75] Inventor: Harry William Hadaway, Eastcote, England

[73] Assignee: London Transport Executive, London, England

[22] Filed: Feb. 3, 1975

[21] Appl. No.: 546,200

[30] Foreign Application Priority Data
Feb. 8, 1974 United Kingdom.................. 5833/74

[52] U.S. Cl............................ 246/182 R; 104/152; 317/5
[51] Int. Cl.[2]............................................ B61L 3/16
[58] Field of Search........ 246/182 R, 182 B, 182 C, 246/187 R; 104/152; 317/5, 19; 318/369; 303/21 CF; 180/105 E; 340/263; 188/181 C

[56] References Cited
UNITED STATES PATENTS
2,222,801  11/1940  Logan............................ 246/182 R
2,841,745  7/1958  Shields........................... 246/182 R

*Primary Examiner*—Trygve M. Blix
*Assistant Examiner*—Reinhard J. Eisenzopf
*Attorney, Agent, or Firm*—Robert D. Yeager; Howard G. Massung

[57] ABSTRACT

Speed governor for automatic trains comprising a dynamo electric device having a plurality of stators, one for each of a plurality of different predetermined speeds, and a common rotor mounted on a shaft connected to an axle of the train and each stator having a primary winding connected across an a.c. supply and a secondary winding connected via a saturable transformer to the d.c. control winding of a transductor whose a.c. winding is connected in the a.c. supply circuit to the stator, a winding of the transformer being connected to train speed control means such that saturation of the transformer occurs at a predetermined rotor speed to increase the impedance of the transductor and reduce the current through the windings of the transformer correspondingly.

4 Claims, 3 Drawing Figures

SPEED GOVERNORS

BACKGROUND OF THE INVENTION

This invention relates to speed governors and particularly to a speed governor for use on railway vehicles. The invention has particular application to automatic trains arranged to travel at accurate predetermined speeds, to provide a precise indication of the speed of the train for speed checking and correction.

SUMMARY OF THE INVENTION

An object of the invention is to provide an electrical or solid state speed governor to replace mechanical speed governors presently used for the above purpose.

A further object of the invention is to provide an electrical or solid state speed governor for automatic train speed control and which is fail safe.

A still further object of the invention is to provide a pair of dynamo electric devices each having a plurality of stators, one for each predetermined speed range of a vehicle and a rotor mounted on or coupled to respective axles of the vehicle to provide a fail safe system of vehicle speed control.

According to one aspect of the present invention there is provided a vehicle speed governor including a dynamo electric device comprising a rotor arranged to rotate in response to rotation of an axle of the vehicle and a stator having a primary winding connected across an a.c. voltage supply and a secondary winding coupled via a secondary winding of a saturable transformer to the d.c. control winding of a transductor. A transductor is a saturable reactor. The transductor's a.c. winding is connected in the a.c. voltage supply circuit to the primary winding of the said stator, a further secondary winding of the saturable transformer being arranged to be connected to vehicle speed control means and the arrangement being such that saturation of the saturable transformer occurs at a predetermined rotor speed to increase the impedance of the transductor and effect a corresponding reduction in the current through both secondary windings of the saturable transformer.

According to a further aspect of the invention there is provided a vehicle speed governor including a dynamo electric device, comprising a plurality of stators one for each of a plurality of different predetermined speeds of the vehicle and a common rotor mounted on a shaft arranged to be connected to an axle of the vehicle, each stator having primary and secondary windings, the primary winding being connected via the a.c. winding of a transductor to an a.c. voltage source and the secondary winding being connected via a saturable transformer to the d.c. control winding of the transductor, the saturable transformer having a first secondary winding arranged to be connected to vehicle speed control means and a second secondary winding connected via unidirectional current conducting means to the said d.c. control winding of the conductor, such that whenever the rotor attains a predetermined speed, the core of the saturable transformer becomes saturated to increase the impedance of the transductor with consequent reduction in the current flowing through the first and second secondary windings of the saturable transformer.

BRIEF DESCRIPTION OF THE DRAWINGS

A preferred embodiment of the invention will now be described by way of example only with particular reference to the accompanying drawing in which.

DESCRIPTION OF THE PREFERRED EMBODIMENTS

Figure 1:
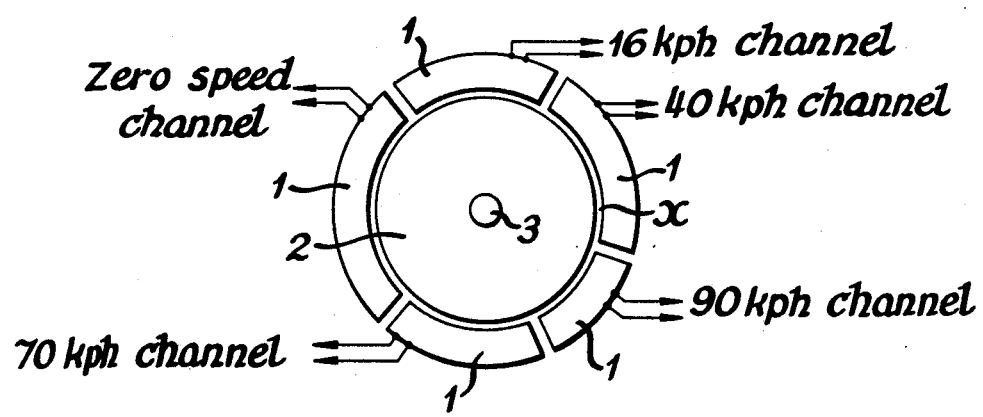
FIG. 1 is a diagrammatic representation of the basic dynamo electric device.
Figure 2:
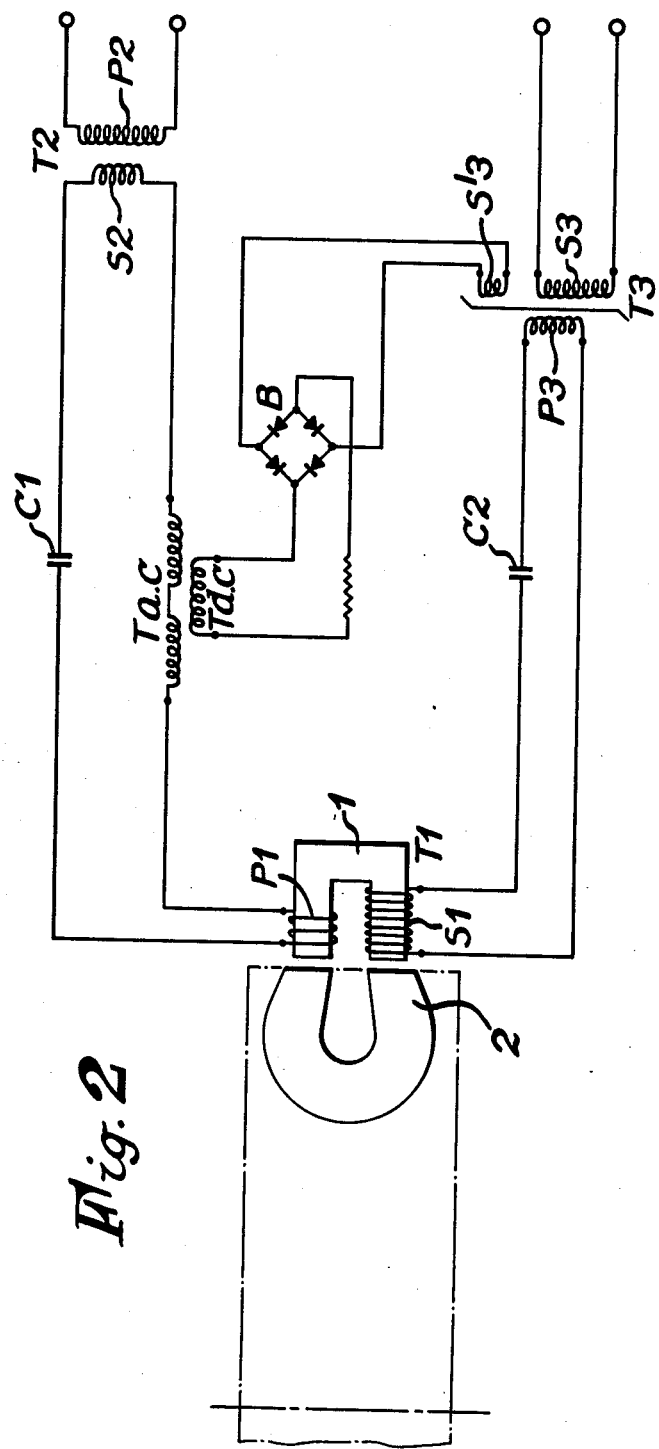
FIG. 2 is a schematic circuit diagram of the electric speed governor of the present invention.
Figure 3:
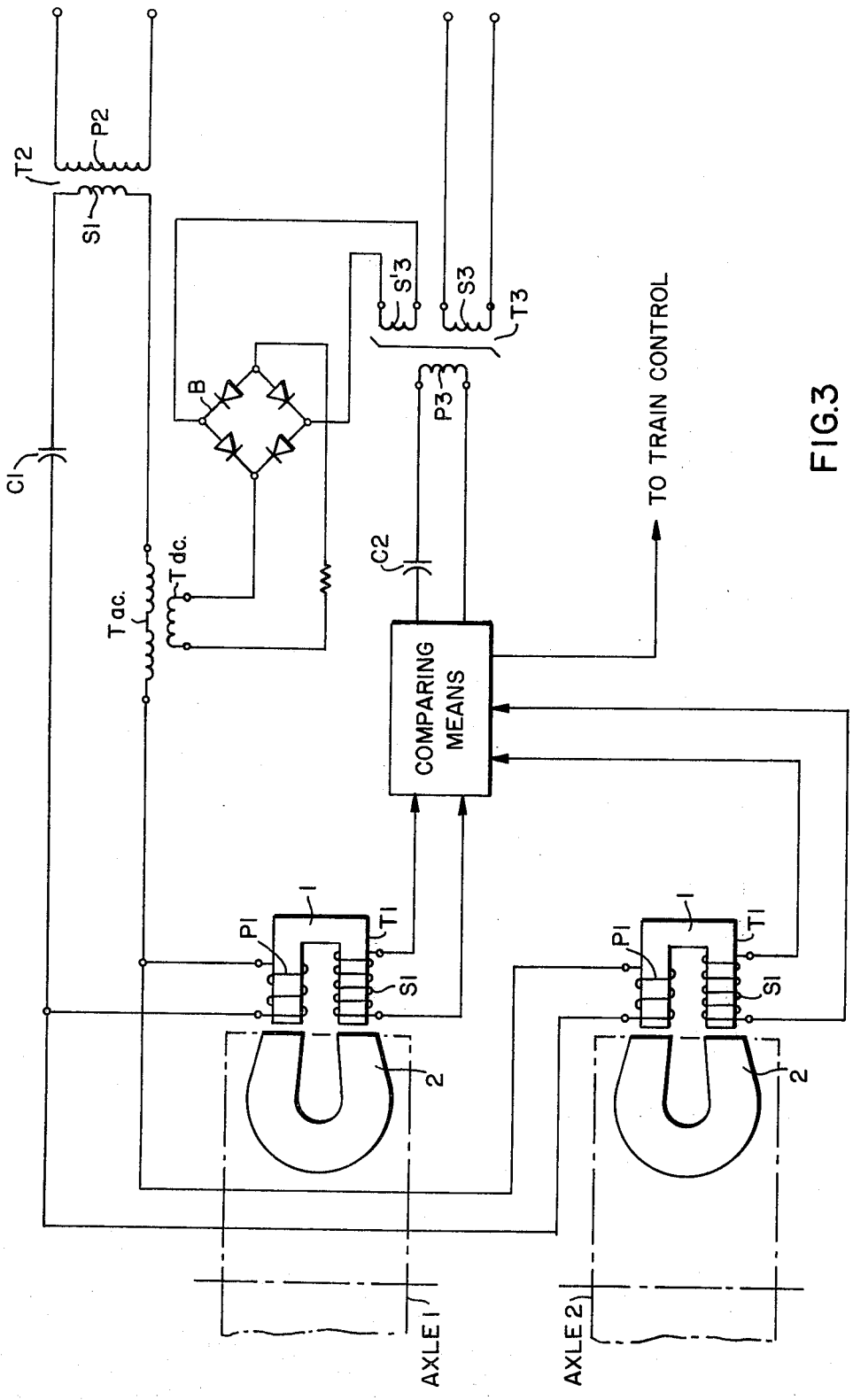
FIG. 3 is a schematic circuit diagram of the electric speed governor of the present invention coupled to two axles.

Each speed of an automatic train is allocated a separate channel and the arrangement shown in FIG. 2 of the drawings is for a single speed, e.g. zero. Further channels are provided for other speeds, e.g. 16 K.p.h; 40 K.p.h., 70 K.p.h. and 90 K.p.h. as shown in FIG. 1. Each speed channel is associated with a respective stator 1, spaced around a common rotor 2 mounted on a common shaft 3 connected to an axle of the train. The distance 'x' between the common rotor 2 and the stators 1 is a function of the frequency of rotation of the rotor. As shown in FIG. 2, each stator 1 is provided with a primary winding P1 connected across the secondary winding S2 of an impedance matching transformer T2 whose primary winding P2 is connected to an alternating current (AC) generator. When the rotor 2 is stationary, the AC generator feeds the primary winding P1 via capacitor C1 and the a.c. winding Tac, of a transductor which at this time is in its low impedance state, and thus a maximum voltage is impressed on the primary winding P1 of the stator 1 of the governor transformer T1.

The secondary winding S1 of the governor transformer T1 is connected via capacitor C2 to the primary winding P3 of a saturable transformer T3 whose main secondary winding S3 is arranged to be connected to a vehicle speed control means (not shown). Transformer T3 is provided with an additional secondary winding S'3 connected via bridge rectifier B to the d.c. control winding Tdc of the transductor. With the rotor 2 at rest, maximum voltage will appear on both secondary windings S3, S'3, of the saturable transformer T3 for the operational speed control output and the feedback loop for the control of the transductor respectively. The voltage across secondary winding S's is converted to a d.c. voltage by rectifier B which supplies sufficient current to the transductor d.c. control winding Tdc to ensure a low impedance transductor state.

Upon rotation of the rotor 2, a low frequency alternating current is induced in secondary winding S1 and supplied to the secondary windings S3, S'3, of the saturable transformer T3. This current is limited at very low frequencies by the series capacitor C2, but as the frequency increases with increase in rotor speed, the current increases with consequential reduction of the impedance presented by the series capacitor C2.

At a predetermined speed of rotor 2, tne saturable transformer T3 attains saturation point and the output voltages across the two secondary windings S3, S'3, begin to fall. The feedback loop supplies less current to the d.c. control winding Tdc of the transductor which results in a higher impedance in the transductor a.c. winding Tac and a consequential reduction in the voltage across the primary winding P1 of the governor transformer T1 and a similar consequential fall in the output from the saturable transformer T3.

Thus, a regenerative action is initiated resulting in a switching operation which results in the transductor attaining its highest impedance value and the saturable transformer attaining its lowest current value. In this high impedance state of the transductor, it should be noted that the AC generator imparts minimum power into the system.

In operation, the driving of a train along the track effects rotation of the rotor coupled to an axle of the train, to generate current in the stator windings. When the train is stationary or proceeding at a low speed, the output from the secondary windings S3, S'3 of the saturable transformer will be at maximum, but if the speed of the train exceeds a predetermined limit, the core of the saturable transformer becomes saturated to reduce the output therefrom and institute the necessary corrective braking action.

The same will occur if any part of the circuit becomes disconnected or short circuited.

The output from the dynamo electric device must be present for normal train operation.

As indicated above, maximum output on all channels occurs whilst the train is stationary. It can be seen therefore, that should the rotor shaft break or seizure occur in the train axle carrying the speed governor, the rotor remains stationary; the output from the saturable transformer in all channels will be at a maximum, indicating that the train has stopped whereas it may well be moving. This, of course, is a most unsafe condition.

To ensure a fail safe operation, a train is provided with two dynamo electric devices, each having the rotor fitted to or coupled to separate and independent axles. The output from each stator winding S1 is monitored and compared, e.g. by a counter device and if in agreement, a null signal is produced which is applied to the primary winding P3 of transformer T3 to control the impedance of the transductor as previously described.

What I claim is:

1. A vehicle speed governor including a dynamo electric device comprising a rotor arranged to rotate in response to rotation of an axle of the vehicle and a stator having a primary winding connected across an a.c. voltage supply and a secondary winding coupled via a secondary winding of a saturable transformer to the d.c. control winding of a transductor whose a.c. winding is connected in the a.c. voltage supply circuit to the primary winding of the said stator, a further secondary winding of the saturable transformer being arranged to be connected to vehicle speed control means and the arrangement being such that saturation of the saturable transformer occurs at a predetermined rotor speed to increase the impedance of the transductor and effect a corresponding reduction in the current through both secondary windings of the saturable transformer.

2. A vehicle speed governor as claimed in claim 1 wherein each vehicle is provided with two dynamo electric devices each having the rotor thereof connected to or coupled to respective axles of the vehicle, and which includes means for comparing the output from each stator of one device with the output from the corresponding stator of the other device to produce a resultant signal for the control of the impedance of the transductor.

3. A vehicle speed governor including a dynamo electric device, comprising a plurality of stators one for each of a plurality of different predetermined speeds of the vehicle and a common rotor mounted on a shaft arranged to be connected to an axle of the vehicle, each stator having primary and secondary windings, the primary winding being connected via the a.c. winding of a transductor to an a.c. voltage source and the secondary winding being connected via a saturable transformer to the d.c. control winding of the transductor, the saturable transformer having a first secondary winding arranged to be connected to vehicle speed control means and a second secondary winding connected via unidirectional current conducting means to the said d.c. control winding of the conductor, such that whenever the rotor attains a predetermined speed, the core of the saturable transformer becomes saturated to increase the impedance of the transductor with consequent reduction in the current flowing through the first and second secondary windings of the saturable transformer.

4. A vehicle speed governor as claimed in claim 3 wherein each vehicle is provided with two dynamo electric devices each having the rotor thereof connected to or coupled to respective axles of the vehicle and which includes means for comparing the output from each stator of one device with the output from the corresponding stator of the other device to produce a resultant signal for the control of the impedance transductor.

* * * * *

UNITED STATES PATENT AND TRADEMARK OFFICE
CERTIFICATE OF CORRECTION

PATENT NO. : 3,980,261
DATED : September 14, 1976
INVENTOR(S) : Harry William Hadaway It is certified that error appears in the above-identified patent and that said Letters Patent are hereby corrected as shown below:

Column 2, line 49, "S's" should read --S'3--

Signed and Sealed this

Twenty-first Day of December 1976

[SEAL]

Attest:

RUTH C. MASON
*Attesting Officer*

C. MARSHALL DANN
*Commissioner of Patents and Trademarks*